United States Patent
Mo et al.

(10) Patent No.: US 7,907,603 B2
(45) Date of Patent: Mar. 15, 2011

(54) ACCELERATION OF LABEL DISTRIBUTION PROTOCOL (LDP) SESSION SETUP

(75) Inventors: Bin Mo, Ayer, MA (US); Robert Thomas, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 341 days.

(21) Appl. No.: 11/740,427

(22) Filed: Apr. 26, 2007

(65) Prior Publication Data

US 2008/0267175 A1 Oct. 30, 2008

(51) Int. Cl.
*H04L 12/50* (2006.01)
*H04L 12/28* (2006.01)
*H04L 12/56* (2006.01)
*G06F 15/16* (2006.01)

(52) U.S. Cl. ............... 370/357; 370/395.2; 709/227

(58) Field of Classification Search .............. None
See application file for complete search history.

(56) References Cited

U.S. PATENT DOCUMENTS

| | | | | |
|---|---|---|---|---|
| 2003/0198243 A1* | 10/2003 | Yamada | .................. | 370/428 |
| 2004/0114595 A1* | 6/2004 | Doukai | .................. | 370/389 |
| 2006/0013126 A1* | 1/2006 | Yasuoka et al. | ............ | 370/217 |
| 2006/0034251 A1* | 2/2006 | Sivabalan et al. | ............ | 370/351 |
| 2006/0062218 A1* | 3/2006 | Sasagawa | .................. | 370/389 |
| 2006/0133300 A1* | 6/2006 | Lee et al. | .................. | 370/254 |
| 2007/0053359 A1* | 3/2007 | Wu et al. | .................. | 370/392 |

OTHER PUBLICATIONS

Juniper Networks Inc, "MPLS Applications Configuration Guide", JUNOS Internet Software for Routing Platforms, Release 7.4, Sep. 2006, p. 327-379.*
L. Anderson, I. Minei, B. Thomas, "LDP Specification", <draft-ietf-mpls-rfc3036bis-03.txt>, IETF, Oct. 2005, entire document.*
Extreme Networks Inc, "MPLS Module Installation and User Guide", Extreme Networks, 1000084-00 Rev. 02, Feb. 2002, p. 63-74.*
L. Anderson, P. Doolan, N. Feldman, A. Fredette, B. Thomas, "LDP Specification", RFC 3036, IETF, Jan. 2001, entire document.*
Wei Luo, et al., "Layer 2 VPN Architectures: Understanding Any Transport over MPLS", May 12, 2005, copyright 2006 Pearson Education, Inc. Informit, Indianapolis, IN.
(Cite A continued) available on the Internet at: <http://www.ciscopress.com/articles/printerfriendly.asp?p=386788&rI=1>.

* cited by examiner

*Primary Examiner* — Chirag G Shah
*Assistant Examiner* — Suk Jin Kang
(74) *Attorney, Agent, or Firm* — Charles E. Krueger

(57) ABSTRACT

In one embodiment, a network device executes a Label Distribution Protocol (LDP) that sends LDP Hello messages at a default rate. The rate of sending LDP Hello messages is modified to accelerate the establishment of an LDP session between the network device and an LDP peer.

2 Claims, 6 Drawing Sheets

LSR2 discovers LSR1
LSR2 opens listening port or
initiates TCP connection

LSR1 discovers LSR2
LSR1 opens listening port or
initiates TCP connection

ACCELERATION OF LABEL DISTRIBUTION PROTOCOL (LDP) SESSION SETUP

BACKGROUND OF THE INVENTION

Multiprotocol Label Switching (MPLS) is utilized to achieve many of the benefits of a circuit-switched network over a packet-switched network. MPLS works by prepending labels to packets and packets are switched according to labels instead of look-up of destination addresses.

One of the fundamental tasks in the MPLS architecture is to exchange labels between label switch routers (LSR) and define the semantics of these labels. LSRs follow a set of procedures, known as label distribution protocol (LDP), to accomplish this task.

LDP peers are two LSRs that use LDP to exchange label information. An LSR might have more than one LDP peer, and it establishes an LDP session with each LDP peer. An LDP session is always bidirectional, which allows both LDP peers to exchange label information.

TECHNICAL FIELD

The present disclosure relates generally to techniques for accelerating the setup of a session between LDP peers.

DESCRIPTION OF EXAMPLE EMBODIMENTS OVERVIEW

Various embodiments disclose techniques to modify the LDP default rate of transmission of Hello messages or to accelerate the opening of a Transmission Control Protocol (TCP) listening port on an LSR in order to accelerate the establishment of an LDP session between LDP peers.

The following describes normal LDP operation sufficiently to support the description of the example embodiments.

Normal LDP operation will be described with reference to the topology depicted in FIG. 1. To establish an LDP session, LSR1 and LSR2 must first discover one another. Following discovery, a session is established by opening a TCP connection between LSR1 and LSR2 and using it to exchange messages which set session parameters.

LSRs use LDP discovery procedures to locate possible LDP peers. The basic discovery mechanism identifies directly connected LDP peers. An extended discovery mechanism identifies non-directly connected LDP peers. LSRs discover LDP peers by exchanging LDP Hello messages. There are two types of LDP Hello messages. LDP Link Hellos are used for LDP basic discovery where the LSRs are directly connected by a link. For some MPLS applications non-directly connected LSRs must exchange label information. Before establishing LDP sessions between non-directly connected LSRs, the LSRs engage in LDP extended discovery by periodically sending Targeted Hello messages to a specific address. When an LSR sends a Targeted Hello message to a receiving LSR, the receiving LSR can either accept the Targeted Hello or ignore it. The receiving LSR accepts the Targeted Hello by creating a Hello adjacency with the originating LSR and periodically sending Targeted Hellos to it.

Figure 2:
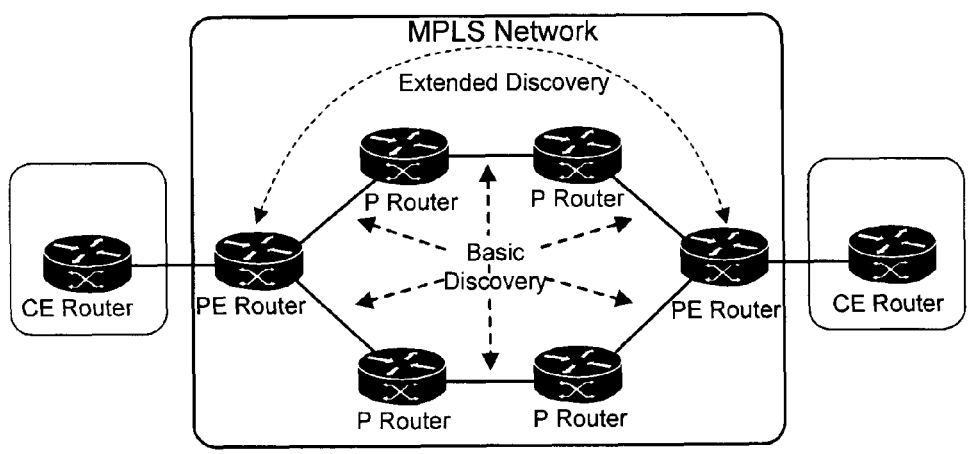
FIG. 2 illustrates an LSR topology which uses both basic and extended discovery.

FIG. 2 shows a simple typical MPLS network and indicates where LDP basic discovery and LDP extended discovery are likely to occur.

As described above, directly connected LSRs discover each other via basic discovery by transmitting Hello messages on the link(s) which connect them. Referring now to FIG. 1, when LSR2 receives a Hello message from LSR1 it considers LSR1 to be discovered.

Figure 3:
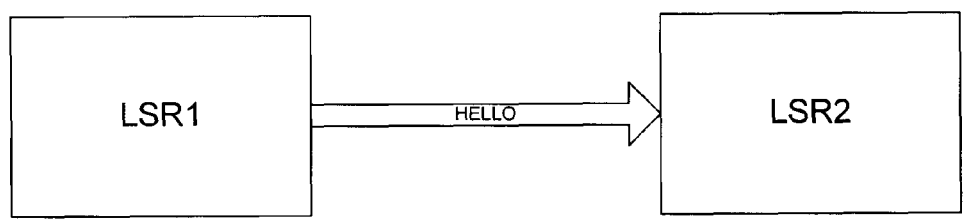
FIG. 3 illustrates an example of the LDP discovery sequence.
Figure 3:
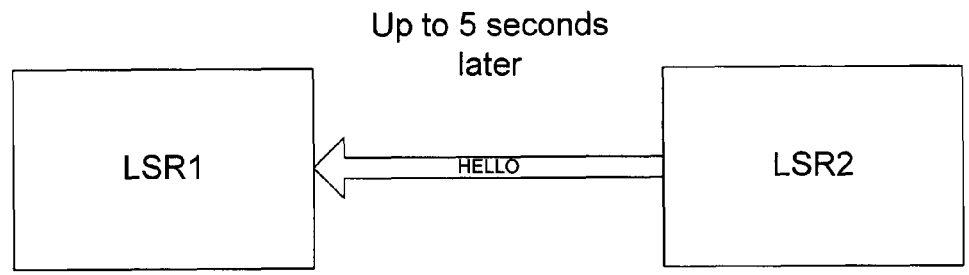

The first step in session establishment is the establishment of a reliable transport connection between LDP peers. If both LDP peers were to initiate an LDP TCP connection, two concurrent TCP connections might result. To avoid this situation, after an LSR discovers a potential peer it determines whether to play an active or passive role in establishing the session TCP connection. The LSR does this by comparing its IP address (treated as an unsigned integer) with that of the discovered potential peer. The LSR with the smaller address plays the passive role. In this example, LSR1 has an IP address "1" and LSR2 has an IP address "2". As depicted in FIG. 3, depending on whether an LSR plays the active or passive role, it will either initiate the establishment of a TCP connection to a discovered peer or open a TCP listening port.

Figure 1:
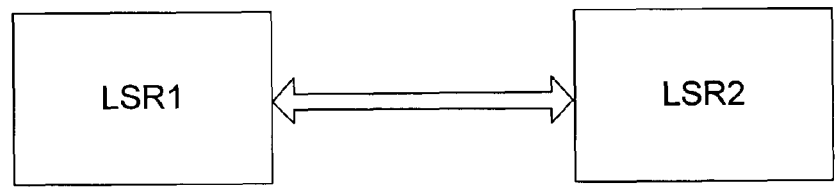
FIG. 1 illustrates an example of an LSR topology.

For the simple topology of FIG. 1, when LSR1 receives a discovery Hello message it determines that it should play the passive role and waits for LSR2 to connect to it by opening a TCP listening port. In this situation LSR2 plays the active role and attempts to open a TCP connection to the listening port of LSR1.

DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order to avoid unnecessarily obscuring the present invention.

The LDP procedure for establishing the session TCP connection allows various situations which may delay the establishment of the connection between LDP peers. In conventional LDP implementations the LSRs send the discovery Hello messages independently and periodically. Two LSRs may discover each other at different times. The difference may be large, as the default Hello interval is 5 seconds. This difference may result in slow LDP session establishment as described in more detail below.

Consider FIG. 3, and assume that LSR1 and LSR2 are using the default Hello interval which causes each to send a Hello every 5 seconds. For this situation in the worst case, LSR1 sends a Hello message at time "0" and LSR2 sends its Hello message at time "5". LSR2 discovers LSR1 when it receives LSR2's Hello message. LSR2 then determines from the Hello message that its IP address is greater that the IP address of LSR1, assumes the active role and attempts to establish a transport connection with LSR1. However, LSR2 can not successfully establish the TCP connection to LSR1 until LSR1 discovers LSR2 by receiving LSR2's Hello message sent at time "5" and opens its listening port shortly thereafter. Thus, the establishment of the connection is delayed by the default time between the sending of Hello messages.

Figure 4A:
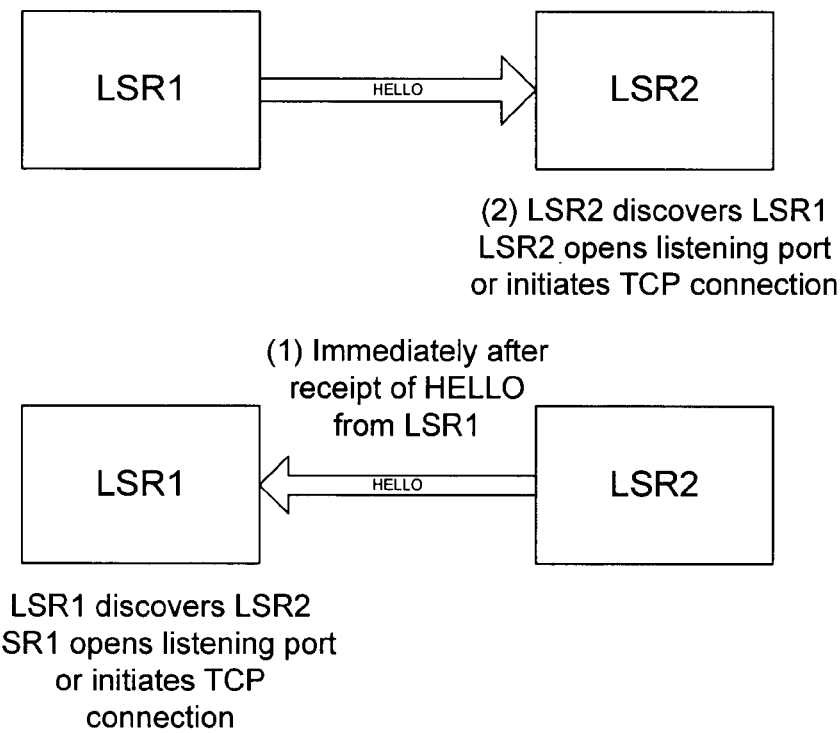
FIG. 4A illustrates an example of sending a Hello message immediately after receipt of a Hello message.

A first embodiment of the invention will now be described with reference to FIG. 4A. The peer discovery procedure is modified such that LSR2 sends a Hello message immediately when it receives the first Hello message from LSR1. This allows LSR1 to discover LSR2 and open its listening port shortly after LSR2 has discovered it, enabling the LDP session connection to be established with little delay.

This first embodiment, as described in the previous paragraph, works well when LSR1 and LSR2 are connected by a point-to-point link. However, when an LSR is connected to a multiaccess link, such as an ethernet, responding to the first Hello received on the link could result in a "storm" of Hellos, significantly slowing session establishment. For example, suppose that there are 10 LSRs connected to the multiaccess link and that each LSR has LDP enabled for the link. LSR1's first Hello will be received by each of LSR2 through LSR10. Each will respond to LSR1's Hello with its own Hello, and each of those (first) Hello's will trigger a response by each of the other LSR's. If there are N LSR's connected to the multiaccess link the number of such Hello's is $N*(N-1)$.

Although it is unlikely that all LSR's on a multiaccess link will start LDP at precisely the same time the underlying hardware that supports the link may be such that connectivity between large subsets of the LSR's may suddenly change. There is at least one recently deployed network with hundreds of LSRs running LDP connected to the same multiaccess link. While such a large number of LSRs on a multiaccess link is not typical this first embodiment must not slow session establishment and should help accelerate it when two large subsets previously partitioned are reconnected.

Figure 4B:
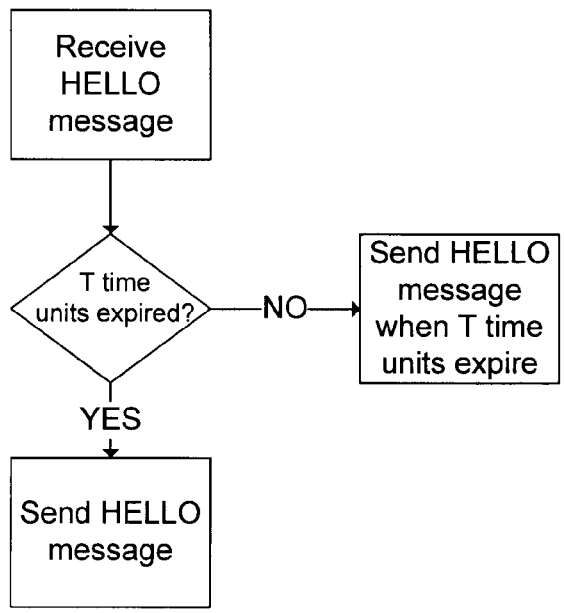
FIG. 4B illustrates an example of delaying the sending a Hello message if a time period has not expired.

The following refinement to the first embodiment prevents the Hello storm. As depicted in the flow chart of FIG. 4B, when an LSR receives the first Hello from a peer on a multiaccess link the LSR checks whether it has sent a Hello within the last T time units (e.g. milliseconds). If not, it sends its Hello immediately. If it has, the LSR delays sending its Hello until T time units since the last Hello was sent have elapsed. The delay provides an opportunity for the LSR to receive additional first Hello's from other previously undiscovered peers that may be on the multiaccess link, and enables the Hello it sends after the delay to serve as a response to the accumulated first Hello's. This reduces the number of Hello messages required to accomplish the discovery from $O(N^2)$ to $O(N)$.

Another situation which may delay the establishment of a transport connection occurs when Hello messages transmitted by one of the LDP peers is dropped for any of a variety of reasons. Without the second embodiment described below another Hello message will not be sent for five seconds. If consecutive Hello messages are dropped by the system then LDP peer discovery and establishment of the session transport connection can be significantly delayed.

Such drops typically occur in situations where links are over subscribed. Generally the drops are statistical in nature in the sense that the specific packets dropped cannot be predicted. An observation is that the likelihood of getting the initial Hello through to the peer router more quickly would be increased by transmitting Hello's more frequently. That is, since the drops are random, sending more Hello's increases the likelihood that at least one will be received by the peer. Of course, doing so adds to the congestion as well as to the load on the transmitting and receiving LSRs. Consequently, the increased rate should be moderate and temporary.

Another difficulty here is that LSR1 and LSR2 discover each other independently, which potentially delays session establishment because their attempts to establish the session TCP connection are out of sync. Specifically, when LSR2 plays the active role in connection establishment it may try to connect to LSR1 before the TCP listening port of LSR1 is ready. As a result the connection attempt fails and is not retried until LSR1 receives the next Hello from LSR2 about 5 seconds later.

Figure 5:
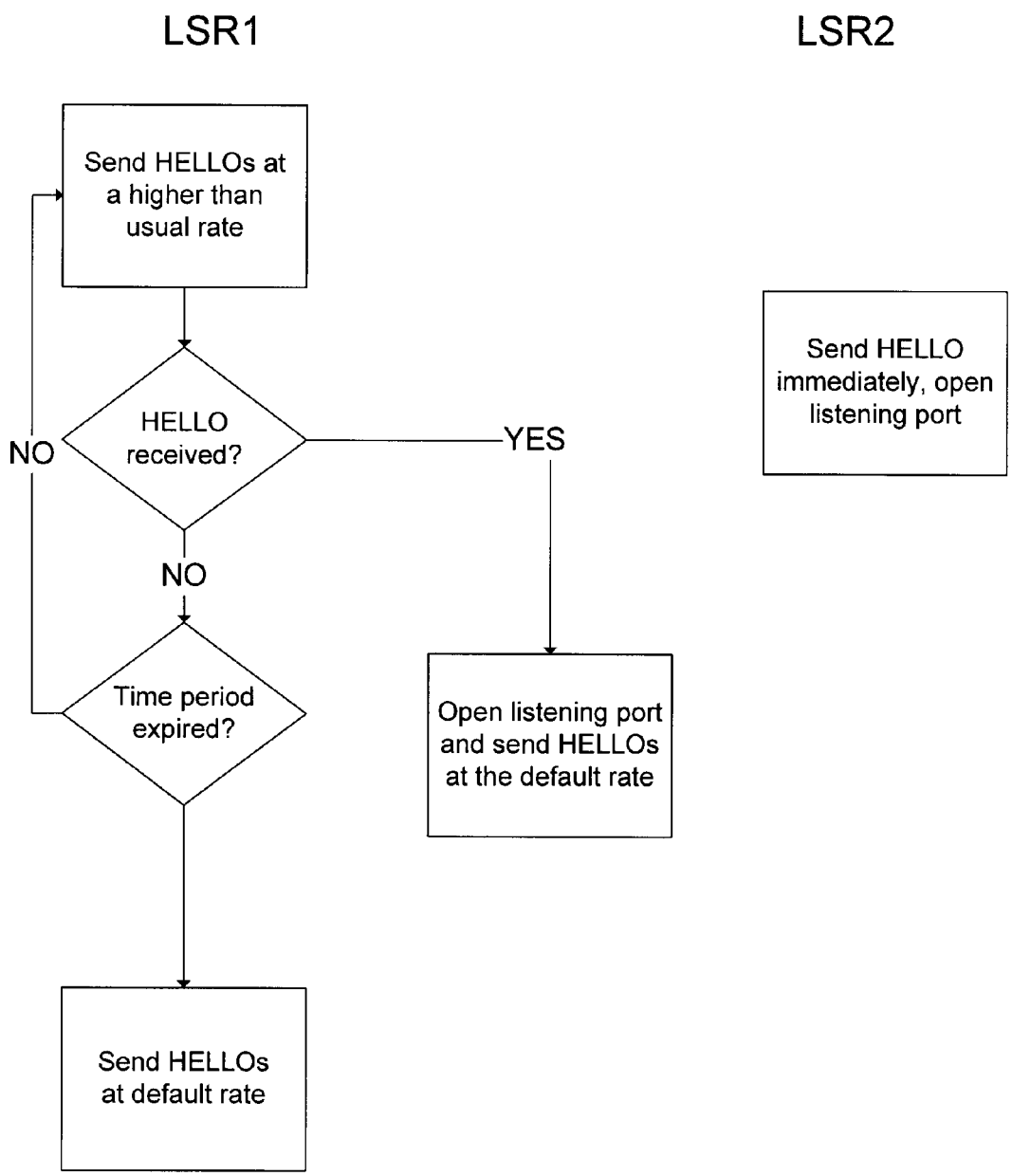
FIG. 5 illustrates an example of sending Hello messages at a rate higher than the default rate.

A second embodiment of the invention will now be described with reference to the flow chart of FIG. 5. The peer discovery mechanism is modified so that when LSR1 becomes ready to send Hello messages to LSR2—for example, because the link has just come up or because LDP has just been configured on the link interface—it sends the Hello messages at a faster than normal rate, for example, one message every 100 ms, until either it receives a Hello message from LSR2 or a predetermined relatively short time period elapses.

Via the first embodiment when LSR2 receives the first Hello message from LSR1 it sends a Hello message immediately (or shortly thereafter). This allows LSR1 to discover LSR2 and open its listening port with minimal delay so that a connection can be established. In addition, in this example, after receiving the first Hello, if it is not already doing so, LSR2 would temporarily send Hello's at the increased rate as well to increase the likelihood that LSR1 discovers it quickly.

A third embodiment, which applies only to the establishment of targeted LDP sessions, is based on the following observation. With link Hello's an LSR typically doesn't know the address of the peer (or peers in the case of a multi-access link such as ethernet) on the other side of the link, or even whether there is a peer running LDP on the other side of the link. However, for targeted LDP sessions the situation is different. For a targeted LDP session the address of the peer can be derived from the LSR configuration. The third embodiment uses this observation; that is, that an LSR sending targeted Hello messages already knows the address of its peer.

Figure 6:
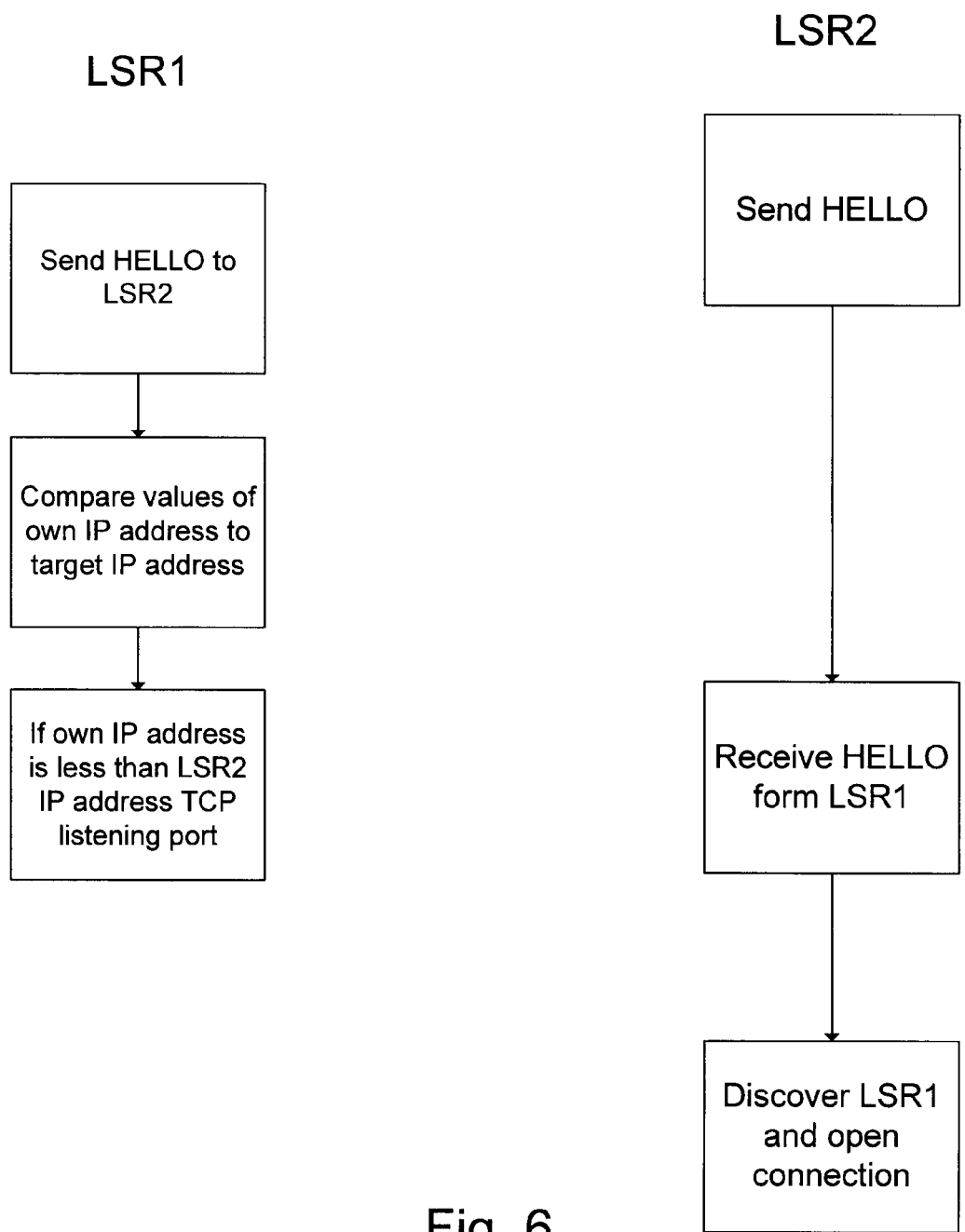
FIG. 6 illustrates an example of opening a listening port when a targeted Hello message is sent.

In this embodiment, as depicted in FIG. 6, when LSR1 sends its first targeted Hello message to LSR2, it determines whether it will play the active or passive role in session establishment by comparing its transport address with the peer's address. In this example, LSR1 plays the passive role and it opens the required TCP listening port when it sends the first Hello message without waiting for a Hello message from LSR2.

This embodiment allows the LSR playing the passive role in session establishment to open its TCP listening port in advance of the receipt of the Hello from the active LSR. Thus, when LSR2 receives the Hello message from LSR1 it can immediately open a TCP connection port because LSR1 has enabled its listening port prior to discovering LSR2.

Various embodiments of the invention have now been described. These embodiments can be utilized in network devices that implement the Label Discovery Protocol by, for example, modifying the LSR software executed by the processor in the network device. Alternatively, the embodiments could be implemented in logic encoded in hardware such as Application Specific Integrated Circuits (ASICs) or Field Programmable Logic Arrays (FPLAs), etc.

Figure 7:
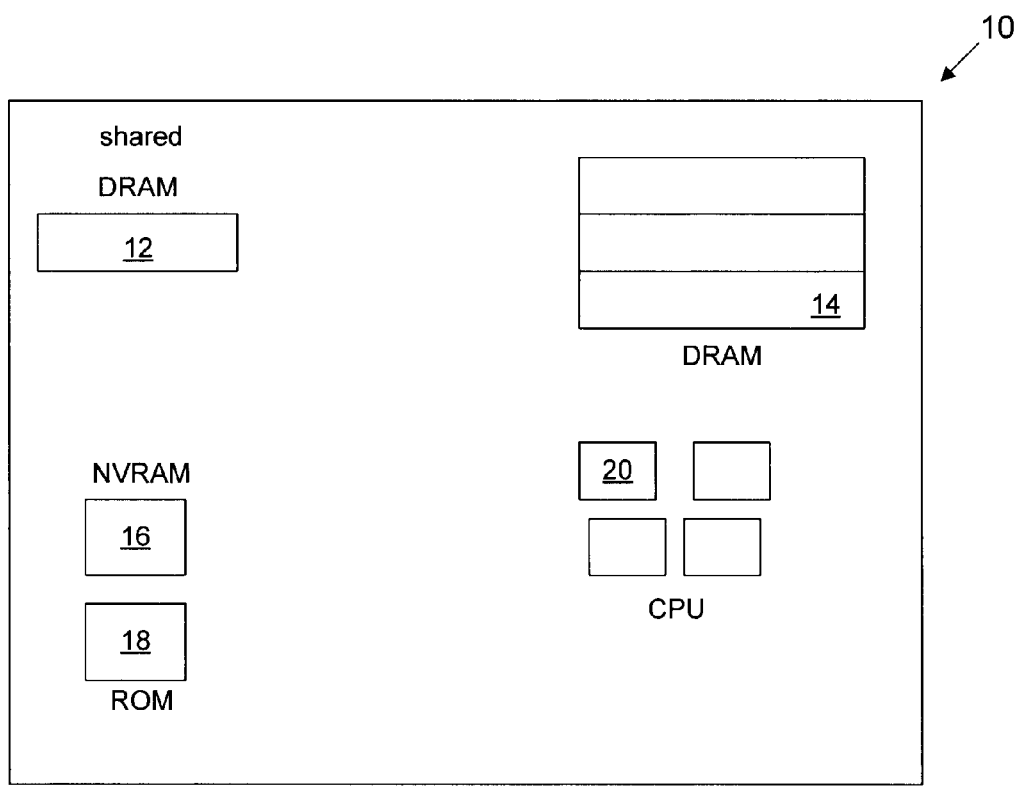
FIG. 7 illustrates the components of a network device.

FIG. 7 depicts an example of a network device including a motherboard 10 having shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the packet buffer of the network device. The NVRAM (non-volatile RAM) is used to store the network device's configuration file and also includes flash memory for storing an image of the LSR software The ROM 18 holds a boot-start program which holds a minimum configuration state needed to start the network device. Alternatively, other configurations of the motherboard can be used. For example, the motherboard may not have separate ROM or NVRAM and the configuration file and LSR software image may be stored and executed out of flash memory.

The invention has now been described with reference to the example embodiments. Alternatives and substitutions will now be apparent to persons of skill in the art. Accordingly, it is not intended to limit the invention except as provided by the appended claims.

What is claimed is:

1. A method comprising:
preparing to send a first targeted hello message of a label distribution protocol at a first label switch router assigned a first transport address value, where the first label switch router is part of an LSR configuration, with the targeted hello message including a second transport address value of a targeted label switch router;
comparing the first and second transport address values, using a processor at the first label switch router, when the first targeted hello message is sent and prior to the exchange of targeted hello messages between the first label switch router and the targeted label switch router to determine whether the first label switch router is an active or passive label switch router with regard to setting up a TCP connection between the first and targeted label switch routers, where the second transport address value compared is not advertised by the targeted label switch router but is derived at the first label switch router from the LSR configuration; and
opening a TCP listening port at the first label switch router, if the first label switch router is the passive label switch router, when the targeted hello message is transmitted and prior to receiving a hello message from the targeted label switch router to allow the targeted label switch router to establish a TCP connection with the first label switch router before the first label switch router discovers the targeted label switch router to establish the TCP connection prior to the exchange of targeted hello messages between the first label switch router and the targeted label switch router.

2. An apparatus comprising:
a memory storing label distribution protocol software, modified peer discovery software and a first transport address value;
a network interface configured to send and receive label distribution protocol hello messages over connected links; and
a processor, coupled to said memory and said network interface, configured to execute the software to follow procedures of a label distribution protocol and configured to prepare to send a first targeted hello message, with a targeted message including a second transport address value of a targeted label switch router which is part of an LSR configuration, to compare the first and second transport address values when the first targeted hello message is sent and prior to the exchange of targeted hello messages between the first label switch router and the targeted label switch router to determine whether to act as an active or passive label switch router with regard to setting up a TCP connection between the apparatus and the targeted label switch router, where the second transport address value compared is not advertised by the targeted label switch router but is derived at the apparatus from the LSR configuration, and to open a TCP listening port if acting as the passive label switch router when the targeted hello message is transmitted and prior to receiving a hello message from the targeted label switch router to allow the targeted label switch router to establish a TCP connection with the apparatus before the target label switch router discovers the apparatus and prior to the exchange of targeted hello messages between the first label switch router and the targeted label switch router.

* * * * *